Sept. 25, 1934.   C. F. PILCHER   1,974,784
TRANSMISSION MEANS
Filed May 11, 1933   4 Sheets-Sheet 1

Inventor
Charles F. Pilcher
By Clarence A. O'Brien
Attorney

Sept. 25, 1934.     C. F. PILCHER     1,974,784
TRANSMISSION MEANS
Filed May 11, 1933     4 Sheets-Sheet 2
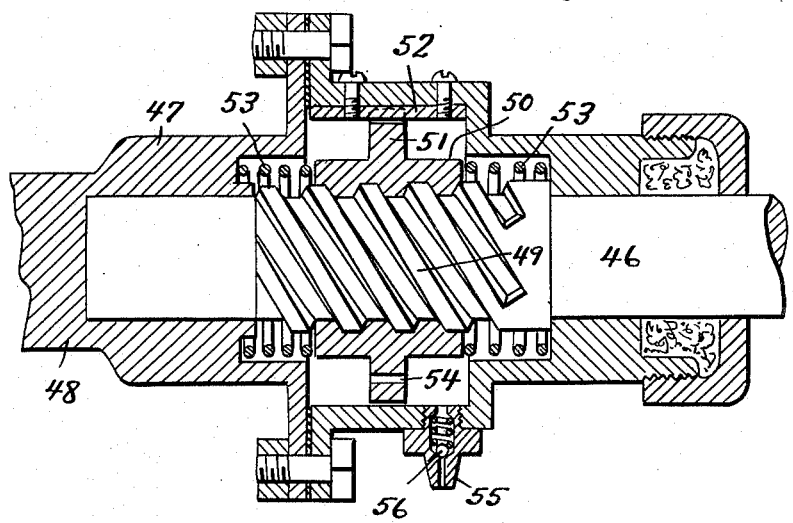
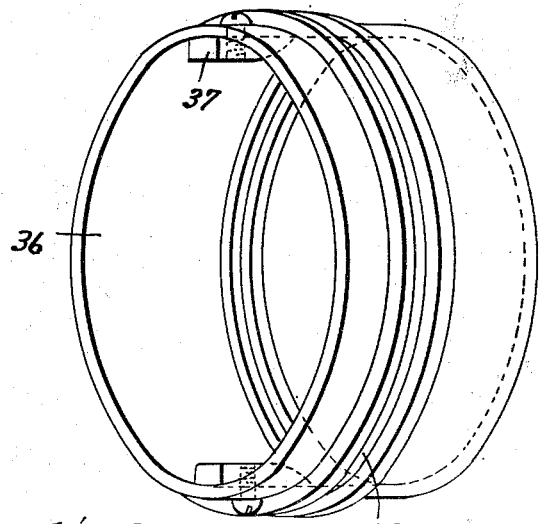
Inventor
Charles F. Pilcher
By Clarence A. O'Brien
Attorney

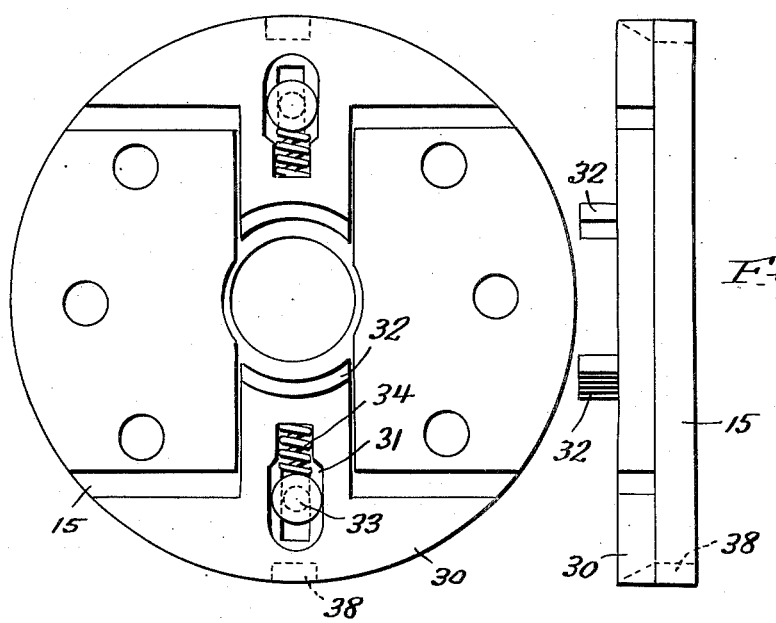
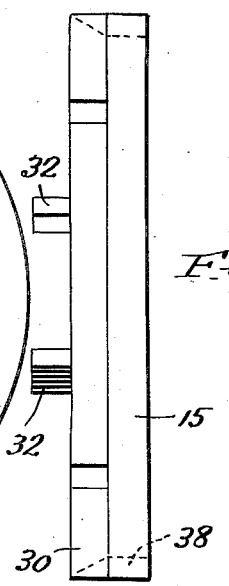
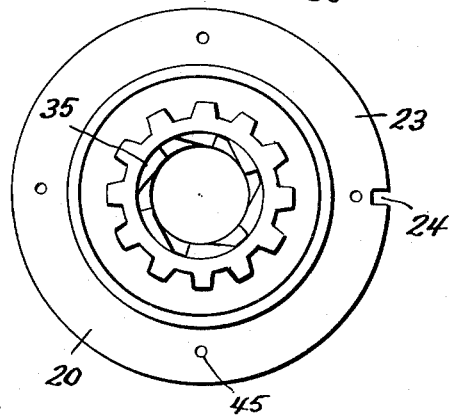
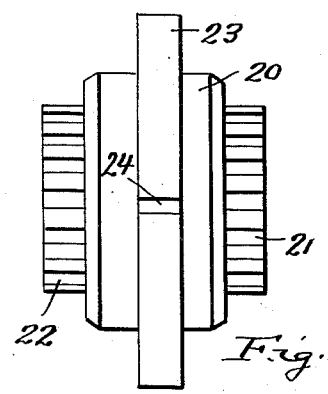

Inventor
Charles F. Pilcher
By Clarence A. O'Brien
Attorney

Patented Sept. 25, 1934

1,974,784

UNITED STATES PATENT OFFICE 1,974,784

TRANSMISSION MEANS

Charles F. Pilcher, St. Louis, Mo.

Application May 11, 1933, Serial No. 670,572

3 Claims. (Cl. 192—43)

This invention relates to transmission means, the general object of the invention being to provide a clutch member for engaging a part to be driven and means for actuating said clutch member by worm means from the drive member, with hydraulic cushion means for absorbing torque shock.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a perspective view of the cam carrying sleeve.

Figure 3 is a view of the thrust plate with the governor members thereon.

Figure 4 is an edge view of Figure 3.

Figure 5 is an end view of the clutch member.

Figure 6 is a side view of said member.

Figure 9 is a longitudinal sectional view, showing the invention used for connecting a drive member with a driven member without the use of the free wheeling parts.

Figure 1:
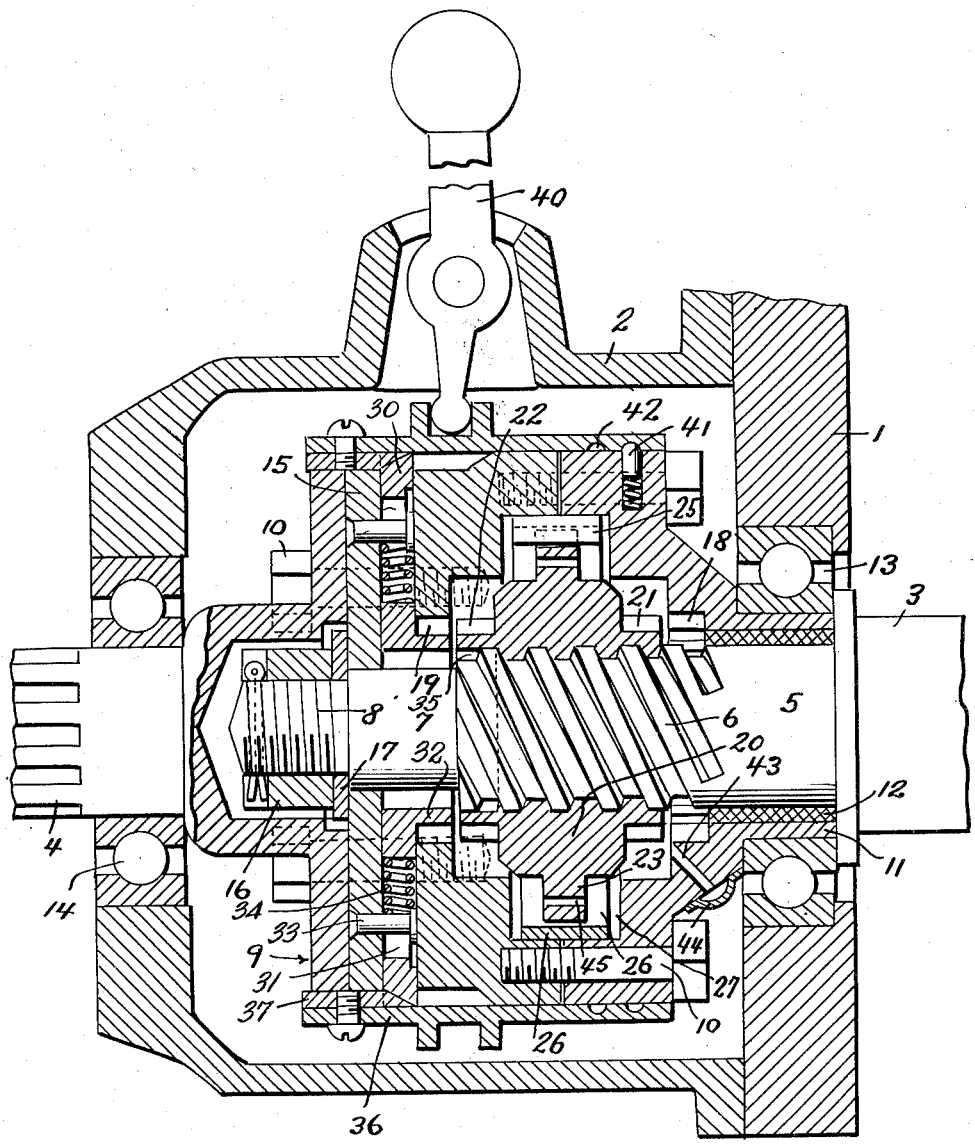
Figure 1 is a vertical sectional view through the invention, showing the same used in a free wheeling device.
Figure 7:
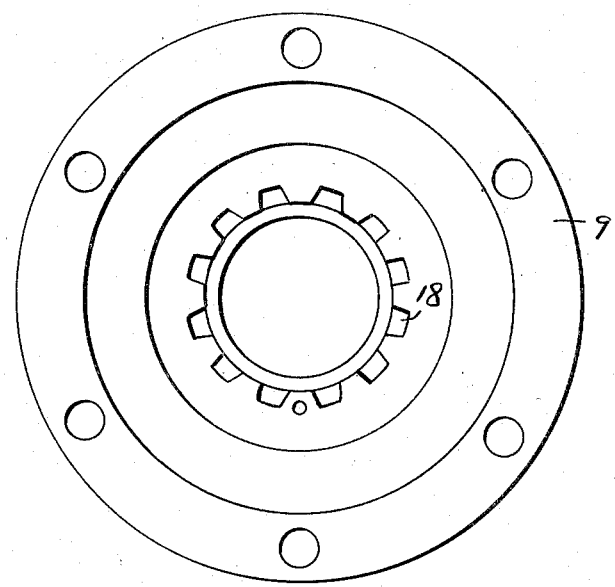
Figure 7 is a view looking into one end of a section of the casing.
Figure 8:
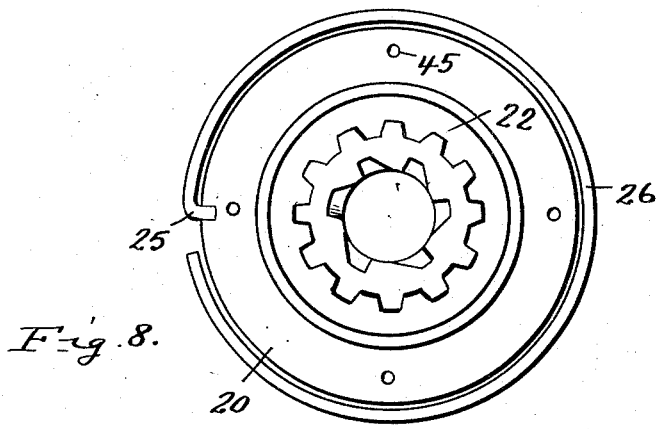
Figure 8 is an end view of the clutch member, with the friction member thereon.

In these drawings, the numeral 1 indicates a portion of the transmission housing and the numeral 2 a portion of the free wheeling device housing. The numeral 3 indicates a portion of the main transmission shaft and the numeral 4 a portion of the jack shaft leading to the differential.

The shaft 3 has a reduced part 5 which is formed with the worm 6 and the shaft is further reduced, as at 7, in rear of the worm and terminates in a threaded part 8. A two-part casing, shown generally at 9, is connected with the front end of the shaft 4 and is located in the housing 2 and the two parts of this casing are connected together by the bolts 10. The front end of the casing is formed with a tubular part 11 in which is located a bushing 12 which surrounds the front part of the reduced portion 5 and anti-friction bearings 13 are placed between this tubular part 11 and the wall of the opening in the housing 1 through which the shaft 3 passes. Similar anti-friction means 14 are placed between the shaft 4 and the walls of the opening through which said shaft passes in the housing 2.

A thrust plate 15 is placed in the rear part of the casing 9 and the reduced part 7 of the shaft 3 passes through said plate and a nut 16 is threaded on the reduced part 8 of the shaft and bears against a washer 17 which engages a shoulder at the junction of the parts 7 and 8. An annular row of teeth 18 is formed in the front part of the casing and surrounds the reduced part 5 of the shaft and a similar row of teeth 19 is formed in the rear part of the casing. A clutch member 20 has a threaded hole therein for receiving the threaded part 6 of the shaft 3 and it is formed with the teeth 21 at its front end and the teeth 22 at its rear end, these annular rows of teeth 21 and 22 being arranged to mesh with the teeth 18 and 19 respectively. As will be understood, when the teeth 21 mesh with the teeth 18, the shaft 3 will drive the shaft 4 in a forward direction and when the teeth 22 are meshing with the teeth 19, the shaft 4 is driven in a reverse direction.

The clutch member 20 is formed with a piston forming ring 23 of considerable width and this ring is provided with a slot 24 for receiving the inwardly bent end 25 of a substantially ring-shaped gripping member or friction member 26. The interior of the casing 9 is formed with an annular chamber 27 in which the friction member and the piston forming ring 23 are located and the circumferential wall of this chamber is engaged by the friction member 26, so that this member acts as a brake for the clutch member. Thus when the shaft 3 is being driven in one direction through the transmission means, the clutch member 20 is sufficiently checked in its rotary movement with the worm 6 by the friction member 26 engaging the circumferential wall of the chamber 27 to cause said member 20 to move forwardly until its teeth 21 engage the teeth 18 and when this occurs, the shaft 4 and casing 9 are caused to rotate with the shaft 3 in a forward direction. When the shaft 3 is rotated in a reverse direction, the clutch member 20 will move rearwardly until the teeth 22 engage the teeth 19 and then the shaft 4 and casing 9 will be driven in a reverse direction from the shaft 3.

It will, of course, be understood that when the shaft 4 is being driven in a forward direction by the shaft 3 and the momentum of the load on shaft 4 causes it to rotate faster than the shaft 3, the clutch member 20 will be moved out of engagement with the teeth 18 so that a free wheeling effect is secured.

In order to prevent the teeth 22 from being moved into mesh with the teeth 19, until the shaft 4 has practically stopped, I provide the weighted members 30, each of which has an arcuate shaped head and an inwardly extending stem and an opening 31 therein. The inner end of each stem has a forwardly extending arcuate flange 32 thereon. Rivets 33 are carried by the plate 15 and pass through the openings 31, which are countersunk as shown, and a spring 34 is placed in each opening and has one end bearing against an inner end of the opening and the other end against the rivet, which tends to force each member 30 inwardly to place the flange 32 against the reduced part 7 of the shaft 3 so that the flanges 32 can enter the recess 35 formed in the rear end of the clutch member 20. When this occurs, the teeth 22 can engage the teeth 19, but when the members 30 are in their outward position, the flanges 32 will engage the end of the member 20 which carries the teeth 22 and thus prevent said teeth 22 from engaging the teeth 19. As will be understood, when the shaft 3 is driven at a certain speed, say at 5 miles per hour, centrifugal force will throw the members 30 outwardly so that the flanges 32 will prevent engagement of the teeth 22 with the teeth 19. When the vehicle slows up, the springs 34 will push the members 30 inwardly so that the flanges will permit the teeth 22 to engage the teeth 19. Thus it will be impossible for the parts to go into reverse until the shaft 3 has stopped rotation or practically so.

In order to render the members 30 inoperative, I provide a sleeve 36 which surrounds the casing 9 and has the cams 37 attached to its inner circumference so that when the sleeve is moved forwardly, these cams will engage recesses 38 on the members 30 and thus push said members inwardly or rather hold said members in their innermost position so that they cannot interfere with the engagement of the teeth 22 with the teeth 19. This sleeve is formed with the exterior groove 39 for engagement by the inner end of the hand lever 40 so that the sleeve can be moved to operative and inoperative position, as desired. A detent 41 carried by the casing 9 is adapted to engage either one of a pair of recesses 42 formed in the sleeve for holding it in either one of its two positions.

The housing 2 is adapted to be filled with oil or the like and this lubricant is forced into the casing 9 through a port 43 by a dipper 44, and, of course, as many of these ports and dippers can be provided as is necessary or desirable. Centrifugal force forces oil in the casing into the chamber 27 and the circumferential wall of the piston 23 is slightly spaced from the outer wall of the chamber and said piston is formed with the transverse passages or ports 45 for the passage of oil from one side of the chamber 27 to the other.

Thus these parts act as hydraulic cushioning means during the forward or rearward movement of the clutch member 20 and act to absorb torque shock.

This shock absorbing feature is shown in Figure 9 as associated with the drive shaft 46 and the casing 47 of a driven shaft 48. In this figure, the shaft 46 is shown as provided with the worm 49 for engaging the interior threads of the clutch member 50, the piston forming part 51 of which has a notch therein for receiving the key 52 attached to an interior part of the casing 47 so that the shaft 48 is driven from the shaft 46. Springs 53 are located at the front and rear of the clutch member 50 and the piston member 51 is formed with the transverse passages 54 for permitting the fluid from one side of the piston to slowly pass to the other side to provide this shock absorbing feature. Lubricant is supplied to the interior of the casing through the fitting 55 containing the check valve 56. Of course, this device, as shown in Figure 9, is not provided with the free wheeling means, as the shaft 46 drives the shaft 48 at all times, but the shock is absorbed by the hydraulic cushioning means, as before described.

Attention is called to the fact that the friction member 26 is of considerable width and is loosely associated with the clutch member 20 so that wear between this friction member and the circumferential wall of the chamber 27 is practically eliminated and there is no danger of the parts failing to operate.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a device of the class described, a drive shaft having a worm thereon, a driven shaft having a casing connected thereto for receiving the worm, an annular row of teeth in the casing at the front end thereof, an annular row of teeth in the casing at the rear thereof, a clutch member in the casing having a threaded opening therein for receiving the worm and said member having front and rear rows of teeth for meshing with the teeth of the casing, a friction member carried by the clutch member and engaging an internal wall of the casing, governor means operated by centrifugal force for preventing the teeth at the rear of the clutch member from engaging the rear teeth of the casing and manually operated means for moving the governor means to inoperative position to permit the teeth at the rear end of the clutch member to engage the teeth at the rear of the casing.

2. In a device of the class described, a drive shaft, a driven shaft, a casing connected with the driven shaft, a worm on the drive shaft located in the casing, a clutch member having a threaded opening therein for receiving the worm, means for connecting the clutch member, after the same has been moved rearwardly or forwardly by the worm, to the casing, means acted on by centrifugal force for preventing the clutch member from engagement with such means at the rear end of the casing and manually operated means for holding the centrifugally operated means in inoperative position.

3. A vehicle driving mechanism comprising a drive shaft having a worm thereon, a driven shaft having a casing connected therewith surrounding the worm, a clutch member having a threaded opening therein for receiving the worm, said clutch member having teeth at its front end and teeth at its rear end and the casing having reverse drive teeth at its rear end for receiving the teeth at the rear end of the clutch member and said casing having teeth at its front end for receiving the teeth at the front end of the clutch member, friction means carried by the clutch member and engaging an internal part of the casing for causing movement of the clutch member by the worm, when the shaft is rotated, governor means operated by centrifugal force for preventing the rear teeth of the clutch member from engaging the rear teeth of the casing, when the drive shaft is rotated above a certain speed, manually operated means for moving the governor means to inoperative position to permit the rear teeth of the clutch member to engage the rear teeth of the casing for reverse rotation, said casing having a chamber therein for receiving fluid and a ring-shaped part on the clutch member fitting in the chamber and forming, with the fluid therein, cushioning means for checking the forward and reverse movement of the clutch member and said ring-shaped member having small transverse openings therein for permitting the fluid at one side of the chamber to escape to the opposite side.

CHARLES F. PILCHER.